(12) United States Patent
Burgard et al.

(10) Patent No.: US 6,471,861 B1
(45) Date of Patent: Oct. 29, 2002

(54) SORPTION VESSEL WITH IMPROVED GRID PIPING

(75) Inventors: Jeffrey E. Burgard, Lombard; Gary A. Schulz, Arlington Heights, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/470,306

(22) Filed: Dec. 22, 1999

Related U.S. Application Data

(60) Provisional application No. 60/113,295, filed on Dec. 22, 1998.

(51) Int. Cl.[7] .............................................. B01D 24/38
(52) U.S. Cl. ...................... 210/232; 210/284; 210/289
(58) Field of Search ................................ 210/232, 284, 210/289, 291

(56) References Cited

U.S. PATENT DOCUMENTS

| | | | |
|---|---|---|---|
| 2,985,589 A | 5/1961 | Broughton et al. ........... 210/34 |
| 4,159,132 A | 6/1979 | Hitz ............................. 285/39 |
| 4,378,292 A | 3/1983 | Haase ........................ 210/266 |
| 4,999,102 A | * 3/1991 | Cox et al. ................... 210/284 |
| 5,131,632 A | 7/1992 | Olson ........................ 285/382 |
| 5,152,556 A | 10/1992 | Holland et al. ............. 285/353 |
| 5,265,917 A | 11/1993 | Hitz ............................. 285/86 |

* cited by examiner

Primary Examiner—Ivars Cintins
(74) Attorney, Agent, or Firm—John G. Tolomei; James C. Paschall

(57) ABSTRACT

A low profile pipe connection improves process performance or substantially reduces reload time for partitioned beds of particulate material separated by distribution/collection grids. This invention is a multi-sectored grid arrangement that connects piping from an intermediate point on each grid sector with a central or peripheral fluid distribution point through the use of a low profile connection. The reduction in diameter of the low profile connection over the usual flanged connection is substantial.

7 Claims, 3 Drawing Sheets

SORPTION VESSEL WITH IMPROVED GRID PIPING

CROSS-REFERENCE TO RELATED APPLICATION

This application claims priority from Provisional Application No. 60/113,295 filed Dec. 22, 1998, the contents of which are hereby incorporated by reference.

BACKGROUND OF THE INVENTION

1. Field of the Invention

This invention relates to piping components for distribution and collection of fluids from grids supporting particulate material such as adsorbents or catalyst. The invention is specifically directed to fluid distributor-collector devices which are placed at several intermediate points in a cylindrical bed of solid material to allow the addition or withdrawal of a liquid stream at any of these several points.

2. Description of the Prior Art

Fluid-solids contacting apparatus are in widespread commercial use as reactors and as adsorption zones. These devices are normally cylindrical columns containing a cylindrical mass of the solid contact material. The solid contact material may be catalyst or solid adsorbent. The fluid flows through the cylindrical mass of solids along the major axis of the column and may flow from one end of the column to another or from one intermediate point in the column to another. To maximize the effectiveness of the intended operation, the fluid should have a uniform composition and flow rate at all points across the cross section of the column to establish a desired "plug flow".

Pressure vessels that contain particulate material for contacting fluids such as gas or liquid process streams are standard features of the chemical and refining industries. In processes for the selective adsorption of components from a multi-component feed and in processes for multi-stage contacting of reactants with a catalyst, partitions commonly subdivide the mass of adsorbent or catalyst in the interior of the pressure vessel into different chambers. The chambers retain a series of adsorbent or catalyst beds comprising discrete particles which permit staged or multiple contacting operations within a single pressure vessel. Such arrangements are routinely used in processes for the simulated moving bed adsorption process. Some fluid-solids contacting columns, especially those used to simulate the movement of the bed of solids, have multiple fluid feed and withdrawal points located intermediate to the ends of the column. At these points it is desired to respectively disperse or collect fluid across the entire cross section of the column.

A simulated moving bed adsorbent process exemplifies a process that regularly uses multiple partitions in relatively large pressure vessels. U.S. Pat. No. 2,985,589, the contents of which are hereby incorporated by reference, describes the moving bed adsorbent process in detail. The process distributes and collects process streams from multiple chambers of adsorbent defined by internal partitions located within a pressure vessel and composed of distribution/collection grids. Periodic shifting of the input and effluent streams over the chambers simulates movement of the adsorbent and permits delivery or withdrawal of the streams with a desired concentration profile.

Delivering or withdrawing the streams requires flat distribution grids. Common arrangements dispose the grids in a vertically oriented pressure vessel having a vertical centerpipe within the vessel with the grids spaced apart vertically for horizontal fluid distribution. U.S. Pat. No. 4,378,292 shows a typical large-diameter grid arrangement. Each grid is in the form of a flat ring extending between the centerpipe and the vertical outer wall of the vessel and comprises a plurality of grid sectors or semi-annular segments that have an overall wedge shape. Beds of solid particles are located between the layers of fluid distributor grids. Grid sectors at each grid level are placed side by side to fill the annular area between the centerpipe and vessel wall.

The grids receive or collect fluid from a plurality of fluid distribution/collection manifolds located in or about the centerpipe at points intermediate the vertically adjacent layers of fluid distributor grids. Requirements for the relatively uniform collection and distribution of fluids from the grids results in the withdrawal or addition of fluid from a central portion of each grid sector. Thus piping is needed to extend from the grid sector through the bed of adsorbent material to the manifold. The term "grid piping" refers to the plurality of fluid distribution/collection pipes that extend from each fluid distributor grid sector to a manifold located above the fluid distributor grid.

Most processes need provision for periodic replacement of the particulate material in the beds which requires disassembly and re-assembly of the grids. To facilitate installation, removal, and maintenance of the grid sectors and the grid piping one or more connections are placed along the length of the grid pipes for installation and removal of the piping. Common practice uses bolted flanges to provide these detachable connections. Installing and maintaining the piping in the numerous grid sections and having the piping connections present in the adsorbent poses a number of disadvantages for the process. For example a differential pressure of as little as 2 psi or less across the relatively flat grids can structurally damage the partitions by causing permanent deformation. Structural damage to the partitions has the potential to create leaks in associated connections of the distribution/collection piping. Such leaks typically contaminate the zones created by the partition and reduce the effectiveness of the separation, particularly with respect to the purity and/or yield of the products recovered from the process.

The flanges must therefore resist leakage at the piping connections. The size and bulk of the necessary flanges detract from process operations. The volume of the flanges over and above the volume of an equivalent length of pipe displaces additional catalyst or adsorbent from the bed. Any loss of particulate material reduces the effective inventory of the bed for the process application.

More importantly, the enlarged profile of the flange relative to the piping disrupts fluid flow through the particulate material immediately upstream and downstream of the protruding flange elements. Adsorbent material downstream of the flange is particularly sensitive to the blocked flow of fluid and results in a "shadowing" effect that renders some portion of the downstream absorbent ineffective for separation and susceptible to extended retention times. The extended retention times further disrupt the desired plug flow of the fluid and can raise the level of impurities in the final products. The degradation of process performance from shadowing usually has the greatest impact when separating viscous materials such as fructose and glucose where the relatively high solids content liquids results being quite viscous as compared to petroleum derived streams.

A well known type of piping connection uses a series of machined grooves on the ends of pipes that are connected by bridging links that have complementary grooves for engaging the grooves on the pipe ends. A sleeve or other retaining means is used to hold the link members against the pipes and the cooperating grooves in engagement. Different forms of these types of connections can be seen in U.S. Pat. No. 5,152,556, U.S. Pat. No. 5,265,917, U.S. Pat. No. 5,131,632, and U.S. Pat. No. 4,159,132. These types of connections have not been used in applications that route piping through beds of particulate material.

Accordingly, it is an object of this invention to improve the utilization and performance of adsorbent or catalyst in partitioned beds of particulate material separated by distribution/collection grids.

It is a further object of this invention to improve the operation of simulated moving bed adsorption process by reducing flow disruption and adsorbent displacement resulting from the presence of grid piping.

BRIEF DESCRIPTION OF THE INVENTION

It has now been discovered that low profile pipe connections can significantly improve process performance or substantially reduce reload time for partitioned beds of particulate material separated by distribution/collection grids. This invention is a multi-sectored grid arrangement that connects piping from an intermediate point on each grid sector with a central or peripheral fluid distribution point through the use of a low profile connection. The reduction in diameter of the low profile connection over flanged connections is substantial.

The low profile connection has an outer radius that is no greater than the 1.25 times inner diameter of the distribution pipe. More typically, the low profile connection provides a mechanical connection having an outer radius that is typically no greater than the inner diameter of the pipe sections that it connects. A flange for a nominal 3-inch diameter pipe has an approximate outside diameter of 8 inches, whereas a typical low profile connection for use in this invention has a diameter of only 5 inches.

When subjected to mechanical loads from partition deformation, typical low profile connections resist leakage to a greater degree than most bolted flange-type connections. Deformation of the partitions, particularly to the point of causing structural damage, results in leakage (commonly referred to as "opening up") of a bolted connection. The connection contemplated for use in this invention can resist such leak producing deformation to about the same extent as the piping that it connects.

The use of this apparatus and process can improve the compositional control of a process stream passing into or withdrawn from a processing chamber as well as increasing the contacting capacity of a particulate material contained in the processing chamber. For an adsorption process, compositional control and increased contacting capacity translates into higher recoveries and purities of the product streams. This invention is highly effective in beds where the invention provides a fluid-solids contacting apparatus for utilization in columns in which a vertical oriented cylindrical bed of adsorbent is divided into a large number of zones by means to admix, add or withdraw a fluid and thereby facilitate the movement of adsorption and desorption zones within the bed to simulate a moving bed of the adsorbent.

Accordingly, in one embodiment, this invention is a fluid-solids contacting apparatus that includes a cylindrical vessel having a vertical major axis and a plurality of distributor grids spaced apart vertically and extending horizontally for distribution or collection of fluid. A plurality of chambers retains solid particles between the layers of fluid distributor grids. A plurality of fluid distribution pipes extends from each grid into the chamber. Each distribution pipe has at least one mechanical connection for joining separable sections of each distribution pipe. The connection comprises a plurality of grooves defined transversely on each opposing end of the connection and a plurality of cooperating grooves defined transversely on a plurality of links for holding the connection ends in sealed alignment by engagement of grooves on each end of the connection with grooves on each link. A locking member retains engagement of grooves until the connection is broken by removal of the locking member and the links. At least a portion of each distribution pipe usually extends vertically such that at least one mechanical connection is located in the vertically extended portion of the pipe. More often, a portion of each distribution pipe will also extend horizontally and a mechanical connection is located in that horizontal portion as well.

In a more limited embodiment, this invention is a fluid-solids contacting apparatus as previously described in described in the previous embodiment that also uses a vertical centerpipe located within the vessel with each grid being in the form of a flat ring extending between the centerpipe and the vertical outer wall of the vessel. Each grid is further divided into grid sectors with a distribution pipe extending vertically upwardly from each grid sector and horizontally over to an inner radius or outer radius of the grid sector.

Additional objects, embodiments, and details of the invention are set forth in the following detailed description of the invention.

DETAILED DESCRIPTION OF THE INVENTION

Figure 1:
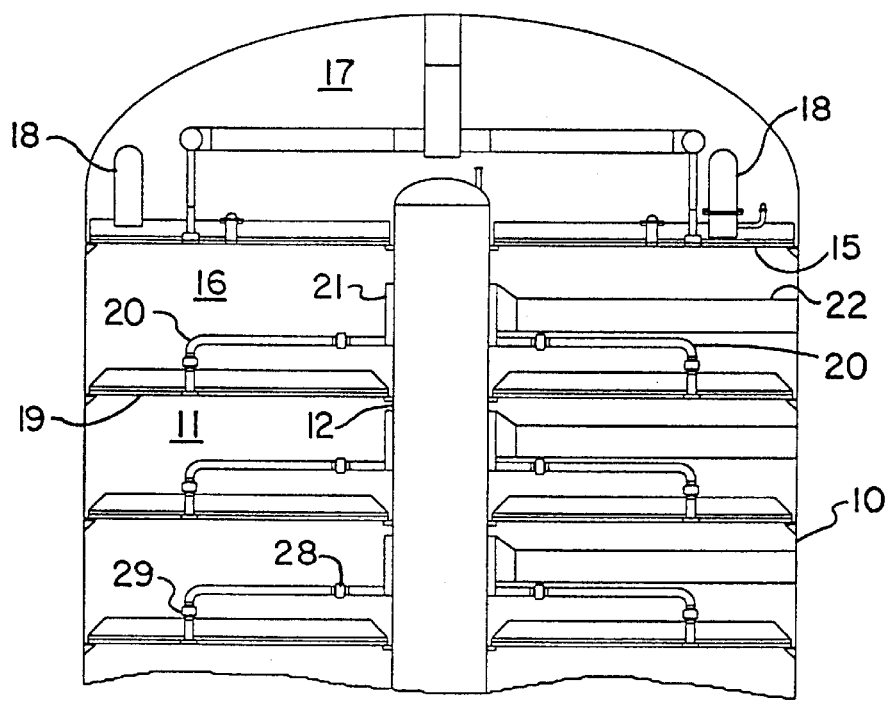
FIG. 1 is a cross section of an apparatus containing the grid piping arrangement of this invention.
Figure 1:
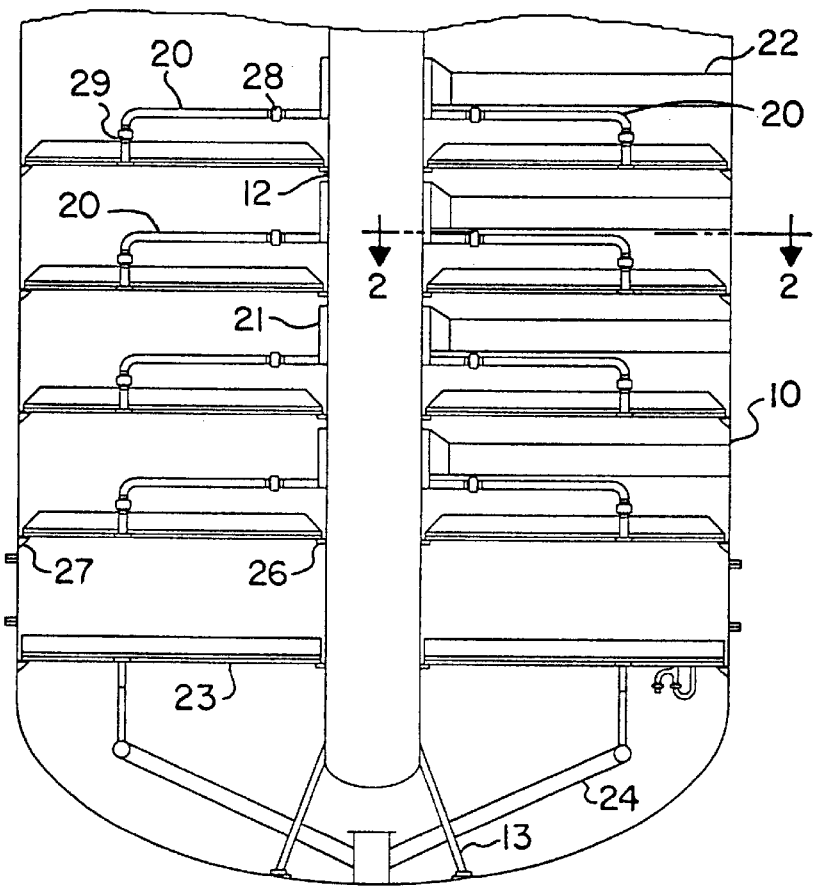

The invention may be applied in any process in which it is necessary to contact a segmented cylindrical bed of a solid material, which may be either a catalyst, an immobilized enzyme, or an adsorbent, with a fluid. The fluid may be either a gaseous mixture or a liquid, but it is primarily intended for use with liquid phase conditions. It is, however, specifically intended that the subject invention be utilized in a separation process in which an incoming feed stream containing at least two different chemical compounds or two different isomers of a single compound are passed through a fixed bed of a material which selectively adsorbs one of the two chemical compounds or isomers. Therefore, although the invention is applicable to most all liquid-solids contacting operations, the majority of the description of the subject invention will be described in terms of a separatory process.

Adsorptive separation processes and the sequential steps for its performance are well known. The subject invention can be practiced using any type of commercially operable and practical selective adsorbent that is in particulate form. The adsorbent may therefore be a naturally occurring substance or a manmade material and it may be in the form of extrudates, pellets or spheres, etc. The adsorbent can be formed from charcoal, alumina, silica or various clays and mixtures of these materials. The preferred adsorbent comprises a shape selective zeolite commonly referred to as a molecular sieve. Commercially used molecular sieves routinely incorporate a binder such as clay or alumina to produce a stronger and more attrition-resistant adsorbent particle. The adsorbent particles preferably have a size range of about 20 to about 40 mesh.

A preferred utilization of the subject apparatus is in a simulated moving bed adsorption process. As mentioned, the movement of the bed of selective adsorptive material is simulated to obtain the effects of the counter-current flow of the bed of solid material and various entering fluid streams such as the feed and desorbent streams. This simulation is performed in part by the periodic movement of the location of various zones such as the adsorption zone along the length of the bed of adsorbent. This movement of the location of the various zones is performed gradually in a unidirectional pattern by periodically advancing the points at which the entering streams enter the adsorbent bed and the points at which the effluent streams are withdrawn from the adsorbent bed. It is only the location of the zones as defined by their respective feed and withdrawal points along the bed of adsorbent which are changed. The adsorbent bed itself is fixed and does not move.

It is important to the successful operation of such a simulated moving bed process that the fluid flows through the bed of adsorbent with a "plug flow" flow regime. That is, it is desired for the entire cross section of the adsorbent bed to be evenly swept by the flowing fluid, with the fluid having a uniform velocity and composition at all different points across the entire cross section of the bed. The separational abilities and capacity of any particular adsorbent bed is in part governed by the degree of uniformity of the vertical fluid flow through the bed since nonuniform flow can lead to backmixing, poor utilization of the adsorbent in some areas of the bed, and a dilution of the streams withdrawn from the bed with undesired materials which are also present in the process such as raffmate or desorbent materials.

The subject invention is particularly useful for large processing units used to separate different components of water-soluble natural substances such as the separation of fructose and glucose. These substances are normally processed as relatively high solids content liquids. This results in some of the process streams, especially the feed streams, being quite viscous as compared to petroleum derived streams. The large flow rates of these viscous streams and certain other design factors result in large diameter adsorption columns which may be more than 5 meters in diameter. It was observed that these factors lead to an increased tendency toward nonuniform fluid flow and maldistribution of the downward flow of high solids process streams. As previously stated, an uneven flow across different parts of a bed of adsorbent results in a lowering of the optimum performance which may be achieved in terms of the balance between total adsorption and selectivity. It is therefore desirable for the flow rate and composition to be the same at all points across the cross section of an adsorbent bed. More details on the separation of monosaccharides using simulated moving bed techniques may be obtained by reference to U.S. Pat. No. 4,226,639, U.S. Pat. No. 4,226,977, and U.S. Pat. No. 4,206,284.

DETAILED DESCRIPTION OF THE PREFERRED EMBODIMENT

The structure and operation of the subject invention may be best described by reference to the Drawings. FIG. 1 presents a cross sectional view taken through the vertical major axis of an apparatus built in accordance with this invention. This view shows only a few of the many layers of horizontal grids which are used in an overall apparatus. The apparatus comprises vessel 10 which surrounds the other components of the apparatus. An imperforate centerpiece 12 is located along the. major axis of the outer vessel and supported by a cone-shaped skirt 13 that supports its weight. At the top of the vessel a head volume 17 contains a piping network that delivers or withdraws fluid from an uppermost boundary of the adsorbent chamber as defined by an imperforate plate 15. Plate 15 receives central support from centerpipe 12. Above plate 15 the volume 17 of the vessel is usually not used for separation purposes and will not contain adsorbent. Fluid communication between chambers 16 and 17 is established through conduits 18 to balance pressure across the relatively thin plate 15 and prevent distortion. The conduits are arranged to segregate fluid in adsorbent chamber 16 from fluid in volume 17. Further details of pressure balancing conduit arrangements are given in U.S. Pat. No. 5,415,773. In a similar manner, imperforate plate 23 is located at the bottom of vessel 10 to seal off the lower head volume. Piping system 24 removes or adds fluid at the level of plate 23. A relatively thin lower plate may be supported by pressure balancing as described in connection with upper plate 15 or by displacement of the empty volume with concrete poured into the lower end of the vessel. The annular volume located above and below plate 15 and 23 is the working volume of the apparatus, and it is in this volume that the adsorbent or other solid particulate material is placed. At the upper and lower ends of the apparatus, a perforate particle-retaining screen may be provided to retain particulate material within the intermediate portion of the apparatus and to provide a hollow annular volume for the collection and distribution of the fluid which is fed to or removed from these terminal portions of the adsorbent bed.

The working volume of the apparatus is divided into a number of annular chambers by a plurality of grids 19 which are placed in a layered arrangement. Vertically stacked layers of grids 19 are located below plate 15. Plate 15 forms the top of an uppermost adsorbent chamber 16 that is ordinarily filled with adsorbent. Uppermost intermediate grid 19 forms the bottom of adsorbent chamber 16 and the top of subsequent adsorbent chamber 11.

Each chamber contains piping for delivering or collecting fluid from each grid 19. Grid pipes 20 deliver or collect fluid from a plurality of points about each grid. A distribution/ collection manifold 21 distributes or collects fluid from all of the grid pipes 20 located in a common chamber. Manifold pipes 22 deliver or collect the process streams that enter or exit the vessel. The grid pipes have low profile connector 28 located in a horizontal pipe segment and low profile connector 29 located in a vertical pipe segment.

Figure 2:
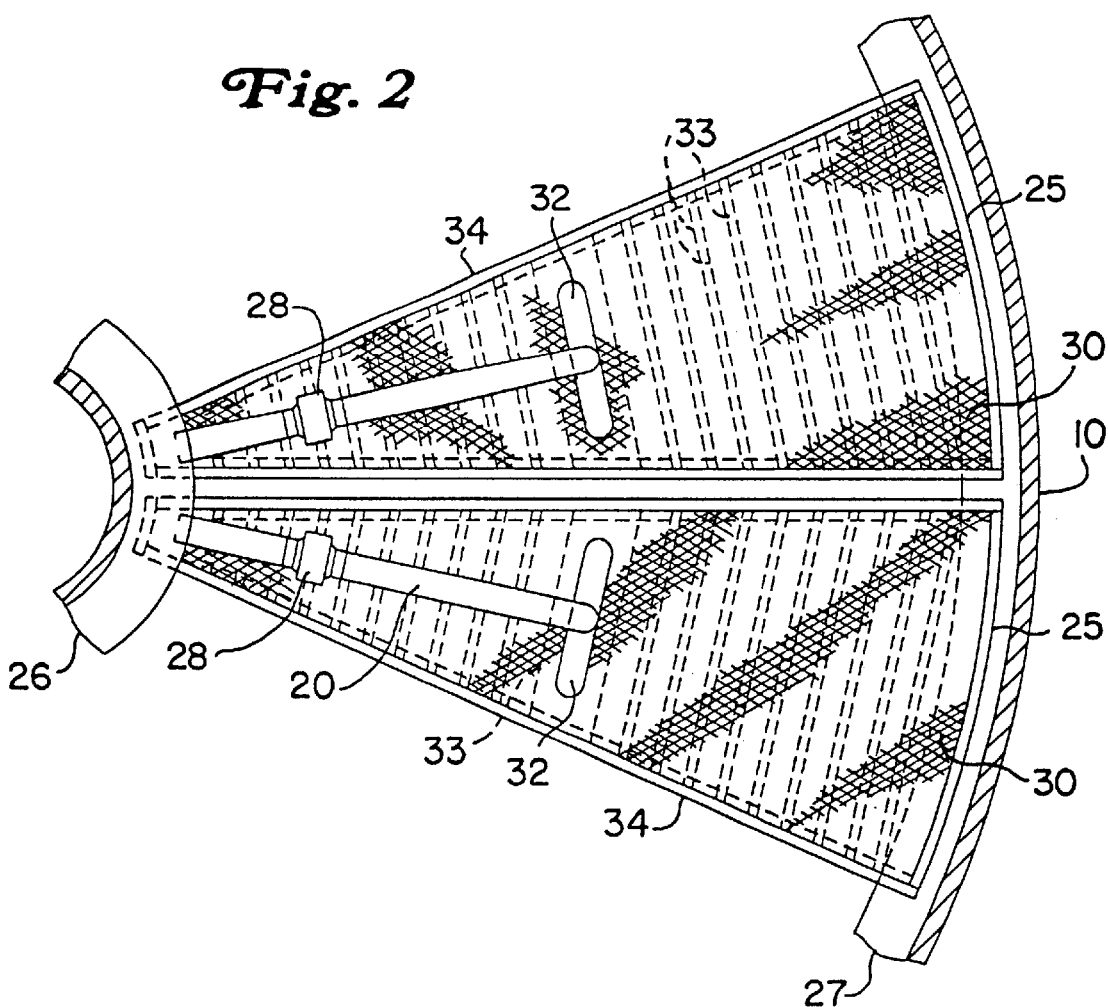
FIG. 2 is a partial section taken along lines 2—2 of FIG. 1.

As shown in FIG. 2, each grid layer is made up of a number of individual wedge shaped sections 25 which are spread around the centerpipe in a circular pattern and which are supported at their inner ends by a support ring 26 fastened to the centerpipe 12 and at their outer ends by a ring 27 attached to the inner surface of the to outer vessel 10. Each grid layer has a top screen section 30 to support the annular bed of adsorbent which substantially fills the volume between vertically adjacent layers and will usually also have a screen on its bottom portion. Vertical screen support ribs 33 are added as needed to transfer the load on the screen to imperforate bars 34 that serve as side supports. A fluid distributor 32 is located below the inlet/outlet of the grid pipe 20.

FIG. 2 shows a single grid pipe 20 serving each grid segment 25. The amount of grid piping may be reduced by connecting the vertical portion sections of grid piping 20 from two or more adjacent grid sections to one common horizontal section of grid piping.

Figure 3:
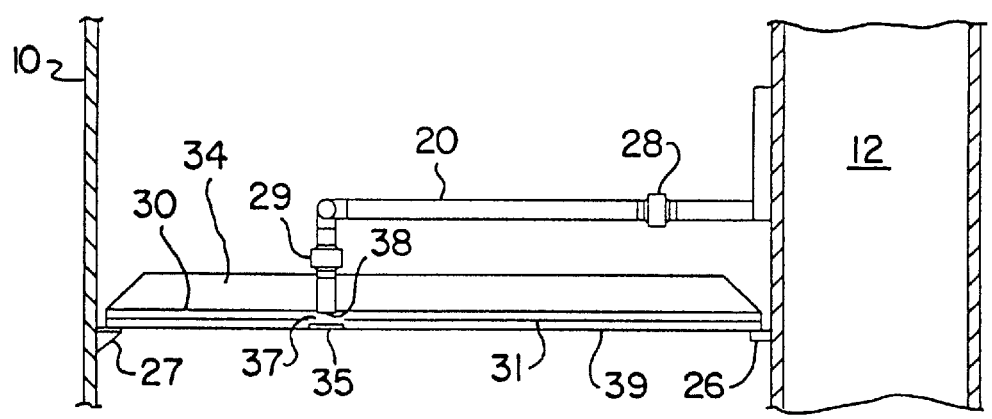
FIG. 3 is an enlarged vertical section of a grid and grid piping taken from FIG. 1.

As shown by FIG. 3, the lower end of each grid pipe is in open communication with a fluid distribution pan 31. Imperforate pan 31 distributes or collects fluid horizontally from all points of the grid segment and may use fluid distributor 32 to collect or distribute fluid from side to side across the grid segment. An opening 37 communicates both sides of pan 31 with the open end 38 of grid pipe 20. For example, fluid may flow from a lower chamber into the grid pipe 20 by passing through lower screen 39, across pan 31 through opening 37 and into open end 38 of pipe 20. A flow impact plate 35 serves to break up any concentrated jet or stream associated with the open end 30. Not all of the grid pipes are actively receiving or delivering fluid at all times. When there is no flow through the grid pipe, channeling all of the flow from each adjacent chamber through the opening 37 serves to remix the process fluid as it passes from one chamber to the next.

Figure 4:
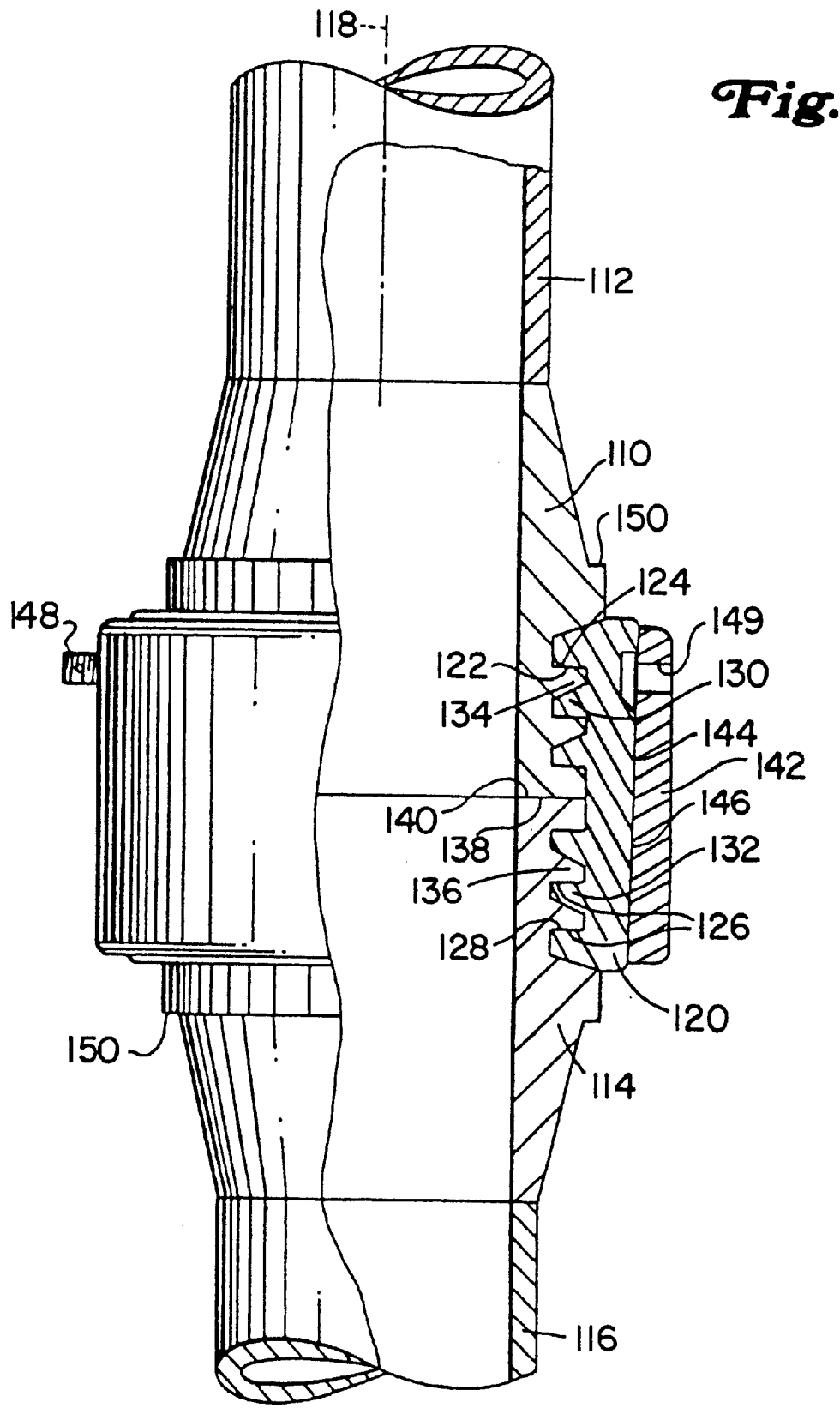
FIG. 4 is a partial section of the low profile connector for use in this invention.

FIG. 4 shows a low profile connection for use in the grid pipes 20. The connection has a connection half 110 joined to a pipe end 112 and a connection half 114 joined to a pipe end 116. Pipe sections 110 and 112 are located about a common axis 118. Each connection half 110, 114 also defines a shoulder 150 for engagement with a suitable device, such as a clamp, to provide an axial force and aligning movement to the connection halves during assembly.

At least two semi-cylindrical links 120 having contact surfaces 124 and 126 engage contact surfaces 122 and 128 on connector halves 110 and 114, respectively. A series of grooves defined by transversely extended ribs 130 and 132 on link 120 define the contact surfaces 126 and 124 respectively. Similarly transversely extended ribs 134 and 136 on connector halves 110 and 114 define contact surfaces 122 and 128. Contact surfaces 122 and 124, and contact surfaces 126 and 128 may extend perpendicularly from the link or connector halves or may have a small taper to urge connector faces 138 and 140 toward teach other. The contact surface may extend all the way around pipe ends and over the entire transverse length of the link or may be formed as intermediate sections of contact surfaces over only a portion of the transverse length of the links and the connector halves. The use of a cooperating lip structure or other grooves on contact faces 138 and 140 can facilitate the alignment and assembly of the connection.

Sealing of the contact faces may also be improved the use of an O-ring in a suitable retaining groove.

Links 120 are held in place by an annular sleeve 142 that has a sloped surface 144 for engagement with a complementary sloped surface 146 on the outside of the links 120. A set screw 148 or other similar attachment device is received by a threaded hole 149 and may be used to keep sleeve 142 in place over links 120. The types of retaining devices are not limited to structures such as sleeve 142. Any suitable retaining structure or mechanism could be used such as a clamp arrangement.

What is claimed is:

1. A fluid-solids, contacting apparatus, said apparatus comprising:
   a cylindrical vessel having a vertical major axis;
   layers of distributor grids spaced apart vertically and extending horizontally for distribution and collection of fluid;
   a plurality of chambers for retaining solid particles defined by and between the layers of distributor grids;
   a plurality of fluid distribution pipes extending from each grid into the chamber, ones of said plurality of fluid distribution pipes including separable sections and said separable sections defining opposing ends; and
   at least one mechanical connection for joining separable sections of each distribution pipe, said connection comprising a plurality of grooves defined transversely on each of said opposing ends of the connection, a plurality of cooperating grooves defined transversely on a plurality of links for holding the opposing ends in sealed alignment by engagement of grooves on each of the opposing ends of the connection with grooves on each link and a locking member to retain engagement of grooves, the mechanical connection having an outer radius that is no greater than 1.25 times an inner diameter of the distribution pipe.

2. The apparatus of claim 1 wherein the mechanical connection has an outer radius that is no greater than the inner diameter of the distribution pipe.

3. The apparatus of claim 1 wherein at least a portion of each distribution pipe extends vertically and a mechanical connection is located in the vertically extended portion.

4. The apparatus of claim 3 wherein a portion of each distribution pipe extends horizontally and a mechanical connection is located in the horizontally extended portion.

5. A fluid-solids, contacting apparatus, said apparatus comprising:
   a cylindrical vessel having a vertical major axis;
   a vertical centerpipe located within the vessel;
   layers of distributor grids spaced apart vertically and extending horizontally for distribution of fluid, each grid being in the form of a flat ring extending between the centerpipe and a vertical outer wall of the vessel and divided into grid sectors;
   a plurality of chambers for retaining solid particles defined by and between the layers of distributor grids;
   a plurality of fluid distribution manifolds located at the centerpipe intermediate vertically adjacent layers of distributor grids;
   a plurality of fluid distribution pipes with one pipe extending vertically upward from each grid sector and horizontally over to an inner radius or outer radius of the grid sector, ones of said plurality of fluid distribution pipes including separable sections and said separable sections defining opposing ends; and
   at least one mechanical connection for joining separable sections of each distribution pipe, said connection comprising a plurality of grooves defined transversely on each of said opposing ends of the connection, a plurality of cooperating grooves defined transversely on a plurality of links for holding the opposing ends in sealed alignment by engagement of grooves on each of said opposing ends of the connection with grooves on each link and a locking member to retain engagement of grooves, the mechanical connection having an outer radius that is no greater than 1.25 times an inner diameter of the distribution pipe.

6. The apparatus of claim 5 wherein each grid sector has a wedge-shaped structure and comprises imperforate side plates extending between the centerpipe and the vessel wall; an upper screen extends horizontally between the side plates; a lower screen extending horizontally between the side plates and a fluid collection/withdrawal point located between the inner and outer radius of the grid sector.

7. The apparatus of claim 5 wherein a mechanical connection is located in the vertically and horizontally extended portion of each distribution pipe.

* * * * *